United States Patent
Beierle et al.

[11] Patent Number: 6,009,084
[45] Date of Patent: Dec. 28, 1999

[54] CONCENTRATING TRANSMULTIPLEXER FOR CABLE TELEPHONY

[75] Inventors: John D. Beierle, Southbury, Conn.; William C. G. Ortel, New York, N.Y.

[73] Assignee: Nynex Science & Technology, Inc., White Plains, N.Y.

[21] Appl. No.: 08/726,641

[22] Filed: Oct. 7, 1996

[51] Int. Cl.$^6$ .................................................. H04J 4/00
[52] U.S. Cl. ........................ 370/307; 370/478; 370/484; 370/525; 370/526
[58] Field of Search ..................... 370/420, 421, 370/481, 478, 307, 433, 434, 465, 466, 315, 319, 321, 484, 485, 525, 526

[56] References Cited

U.S. PATENT DOCUMENTS

| | | | |
|---|---|---|---|
| 3,959,593 | 5/1976 | Mehta | 179/8 A |
| 4,013,842 | 3/1977 | Kao et al. | 370/307 |
| 4,199,660 | 4/1980 | Dill et al. | 370/50 |
| 4,237,551 | 12/1980 | Narasimha | 370/50 |
| 4,813,035 | 3/1989 | Bishop et al. | 370/50 |
| 4,928,272 | 5/1990 | Ohue | 370/50 |
| 5,274,627 | 12/1993 | DeSantis | 370/49.5 |
| 5,299,192 | 3/1994 | Guo et al. | 370/210 |
| 5,325,222 | 6/1994 | Jacob et al. | 359/123 |
| 5,351,234 | 9/1994 | Beierle et al. | 370/49.5 |
| 5,625,624 | 4/1997 | Rosen et al. | 370/307 |
| 5,768,278 | 6/1998 | Virdee et al. | 370/468 |

OTHER PUBLICATIONS

Bellcore (Bell Communications Research), "Integrated Digital Loop Carrier System Generic Requirements, Objectives, and Interface," Technical Reference TR–NWT–000303, Issue 2, Dec. 1992, Rev. 1, Dec. 1993.

DSC Communications Corp., "TM7800–M1 TransMux™ Functional Description," (instruction manual), Rev. C., Feb. 1989.

Harris (Digital Telephone Systems Division), "HIL Protocol," Mar. 1995.

*Primary Examiner*—Douglas W. Olms
*Assistant Examiner*—Seema S. Rao
*Attorney, Agent, or Firm*—Robin, Blecker & Daley

[57] ABSTRACT

A transmultiplexer is connected between digital facilities and analog facilities for translating information between TDM and FDM formats on the digital and analog facilities, respectively. Information in the TDM format is representative of a plurality of digital telephone signal channels and information in the FDM format is representative of a plurality of analog telephone signal channels. The total capacity of the digital facilities is smaller than the total capacity of the analog facilities. Any one of the digital channels can be selectively coupled to any one of the analog channels. The transmultiplexer is installed at a telephone central office facility as an interface between a cable telephony transmission system and a digital telephone switch. A host computer controls both the transmultiplexer and the digital telephone switch.

25 Claims, 6 Drawing Sheets

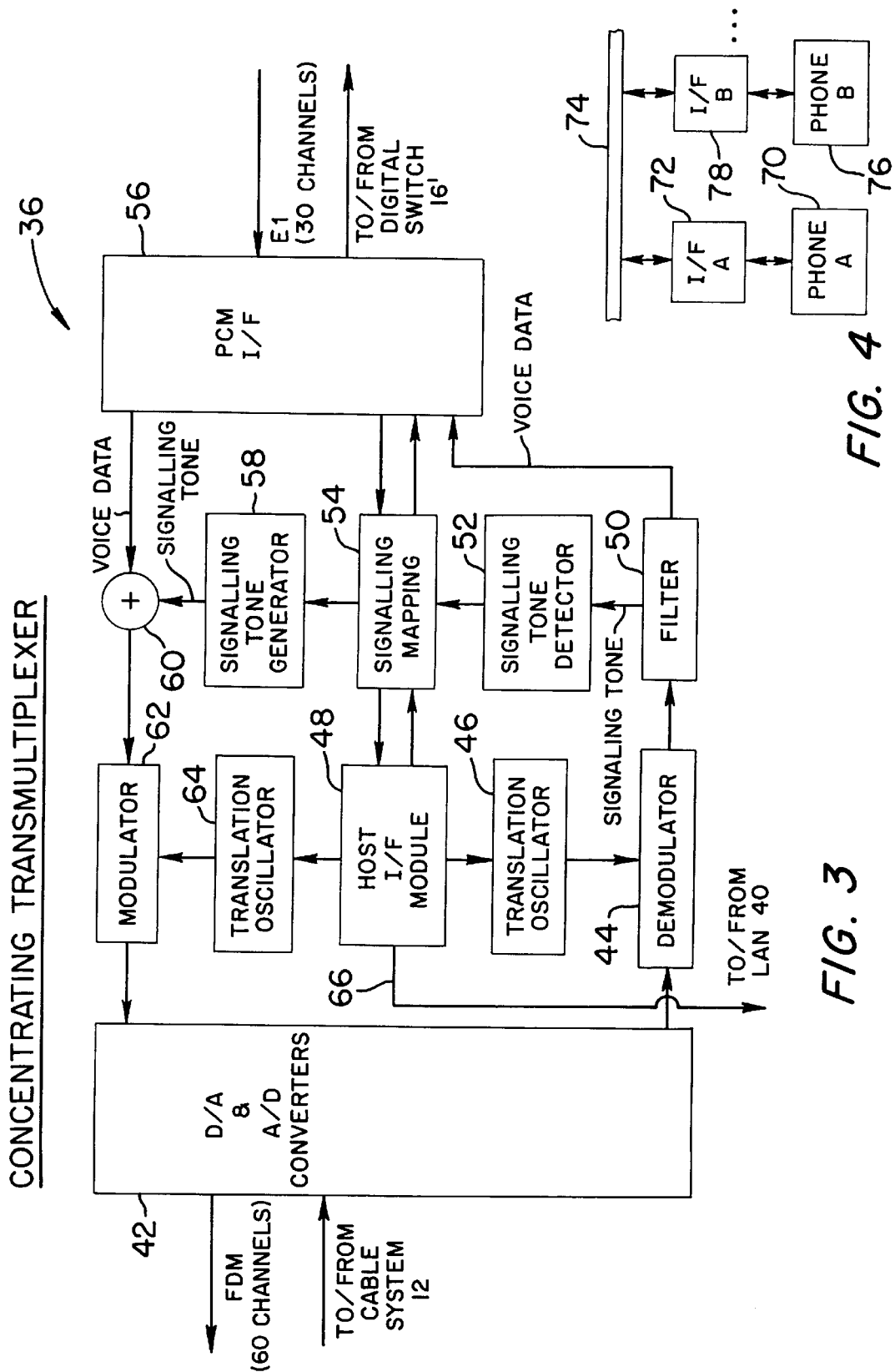

CONCENTRATING TRANSMULTIPLEXER FOR CABLE TELEPHONY

BACKGROUND OF THE INVENTION

This invention relates to telephone systems in which shared analog signal facilities are interfaced to shared digital signal facilities.

U.S. Pat. No. 5,351,234, which has the same inventors as the present application, discloses a system in which video signals are distributed, and switched telephone service is provided, over a common broadband cable network. The disclosure of Pat. No. 5,351,234 is incorporated herein by reference.

FIG. 1 of this application presents a high level block diagram of the shared video and telephone cable system disclosed in the '234 patent. Reference numeral 10 generally refers to the video/telephone cable system. Major components of the system 10 include a cable transmission system 12, a transmultiplexer 14 and a digital 20 telephone switch 16.

Connections are provided between the cable transmission system 12 and n telephone subscriber locations. As indicated in the '234 patent, but not shown in FIG. 1, means are also provided to couple a plurality of video channel signals to the cable transmission system 12. The cable transmission system 12 carries n two-way analog telephone signal channels in a frequency division multiplexed (FDM) format within a frequency band assigned for telephone usage. The width of the frequency band containing the n channels is the same as the bandwidth provided for a video channel. The frequency band which carries the n FDM telephone channels in the cable system 12 is coupled via a modulator/demodulator (not shown) to an analog transmission facility 18 which interconnects the cable system 12 and the transmultiplexer 14.

The transmultiplexer 14 provides translation between the n two-way FDM channels carried on the analog transmission facility 18 and a like number of two-way digital telephone signal channels provided in a time division multiplexed (TDM) format in a digital transmission facility 20. The digital transmission facility 20 is connected between the transmultiplexer 14 and the digital switch 16. The digital switch 16 operates so that any one of the n telephone subscriber locations connected to the cable system 12 can be selectively connected for telephone communication with any other of the n subscriber locations. Also, the n subscriber locations can be connected through the digital switch 16 to subscriber locations maintained in an external telephone network.

The shared video/telephone cable system of the '234 patent provides for efficient use of the bandwidth allocated within the cable transmission system to telephone use. However, it would be desirable to reduce the cost of providing interfacing between the digital switch 16 and the two-way analog telephone channels provided to the subscriber locations.

It is therefore a primary object of the invention to provide an improvement in a system in which a broadband cable network is used to distribute telephone service to plural subscriber locations.

It is a further object of the invention to achieve a reduction in the hardware cost encountered in constructing a telephone system distributed over a broadband cable network.

It is yet another object to achieve concentration of telephone transmission facilities while having all switching and routing take place at a centralized location such as a telco central office.

SUMMARY OF THE INVENTION

In accordance with the principles of the present invention, the above and other objects are realized by provision of a transmultiplexer including circuitry connected between digital facilities and analog facilities for translating information between TDM and FDM formats on the digital and analog facilities, respectively, wherein information in the TDM format is representative of a plurality of digital telephone signal channels, information in the FDM format is representative of a plurality of analog telephone signal channels, the digital facilities have a total capacity of m voice-grade digital channels and the analog facilities have a total capacity of n voice-grade analog channels, with n>m, and the transmultiplexer further includes control circuitry for selectively coupling any one of the m voice-grade digital channels to any one of the n voice-grade analog channels.

Further in accordance with this aspect of the invention, the control circuitry may include circuitry for receiving a command message from a host computer, where the command message indicates a particular one of the analog telephone signal channels and a particular one of the digital telephone signal channels, and the control circuitry also includes assignment circuitry for assigning the particular one of the analog telephone signal channels to the particular one of the digital telephone signal channels in response to the command message received from the host computer.

The assignment circuitry of the transmultiplexer may include sequencing circuitry having a variable oscillator for sequentially oscillating at a plurality of different frequencies according to a variable sequence, each of the frequencies being for demodulating a respective one of the analog telephone signal channels, and circuitry responsive to the received command message for varying the variable sequence of the different frequencies. Alternatively, the assignment circuitry may include sequencing circuitry having a buffer memory for temporarily storing digital signals carried in the digital telephone signal channels and memory control circuitry for controlling the buffer memory so that the digital signals are written into the buffer memory according to a first sequence and are read out from the buffer memory according to a second sequence different from the first sequence, the memory control circuitry including circuitry for varying at least one of the first sequence and the second sequence in response to the received command message.

The transmultiplexer may provide 2:1 concentration by interfacing a total of 60 FDM channels to a total of 30 TDM channels. It is also contemplated to provide 4:1 concentration such that 120 FDM channels are interfaced to 30 TDM channels.

In a preferred embodiment of the invention, the digital facilities are provided to interconnect the transmultiplexer with a digital telephone switch, and all of the digital telephone switch, the transmultiplexer and a host computer are housed within the same building as part of a telephone central office facility.

By providing a concentrating transmultiplexer between the FDM transmission facility and a switch which operates on TDM signals, the present invention makes possible a substantial reduction in the ratio between the number of TDM interface channels provided at the switch and the number of subscribers served by the FDM transmission facility. This results in significant savings in the hardware cost incurred in providing digital switching for telephone channels carried in a shared video/telephony cable system. Also, in contrast to prior art arrangements for multiplexing subscriber loops, which use a relatively complex remote digital terminal installed near the subscriber locations to provide concentration, the present invention permits all switching and routing to take place at a central location.

BRIEF DESCRIPTION OF THE DRAWINGS

The above and other features, advantages and aspects of the present invention will become more apparent upon reading the following detailed description in conjunction with the accompanying drawings in which:

FIG. 3 is a block diagram of a concentrating transmultiplexer that is part of the cable telephony system of FIG. 2;

FIG. 4 schematically shows arrangements for providing connections between telephone subscriber locations and a transmission cable that is part of the system of FIG. 2.

DETAILED DESCRIPTION

Figure 1:
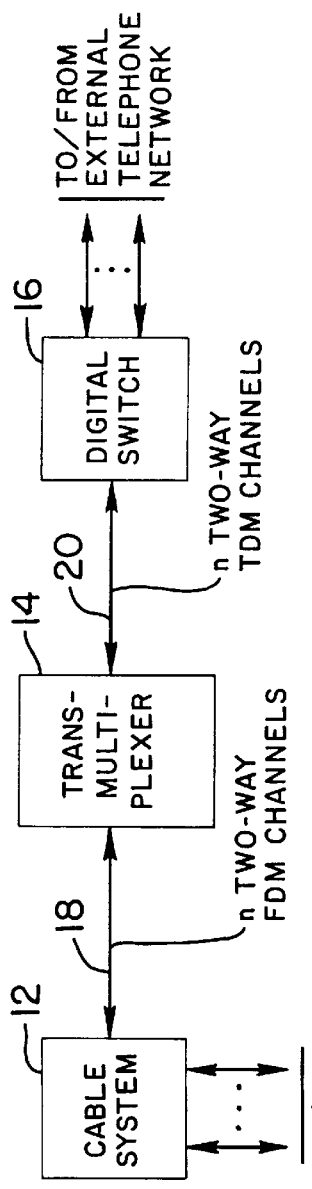
FIG. 1 shows a broadband cable telephone distribution system provided in accordance with the prior art.
Figure 2:
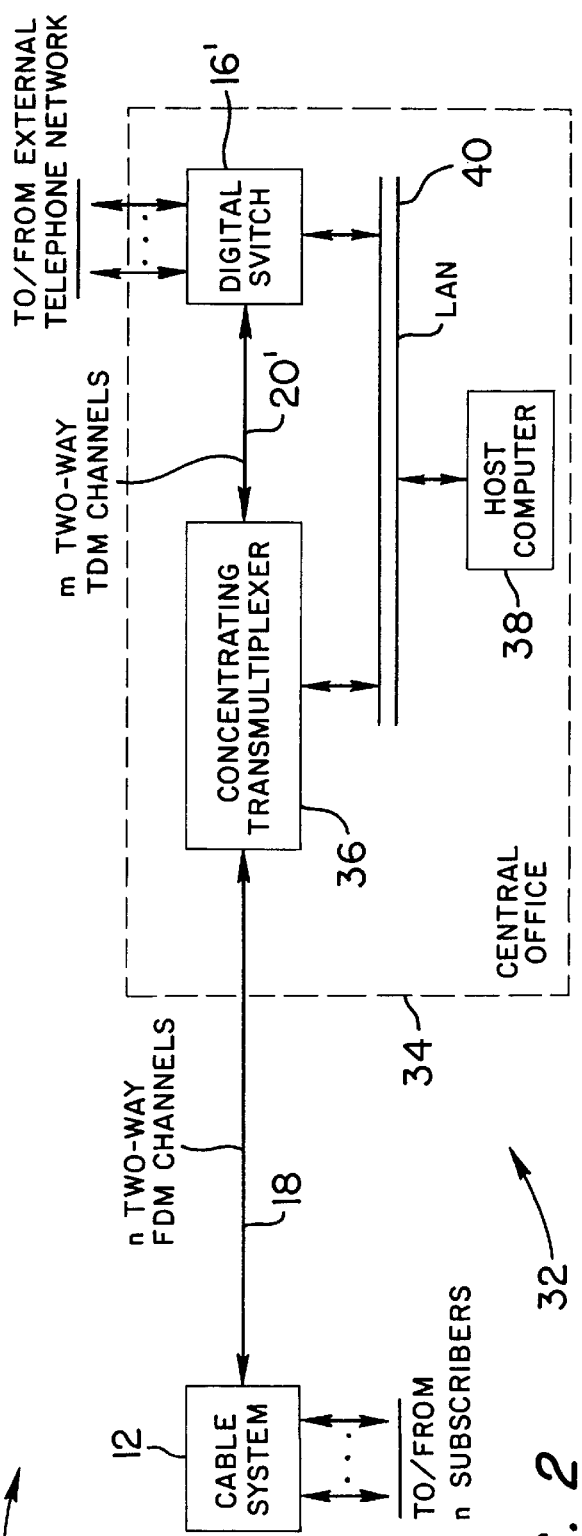
FIG. 2 shows a broadband cable telephone distribution system provided in accordance with the principles of the present invention.

FIG. 2 shows a broadband cable telephony system 30 provided in accordance with the principles of the present invention. As shown, the system 30 includes a cable transmission system 12 as was discussed above in connection with the prior art system of FIG. 1. The cable transmission system 12 is connected via an analog transmission facility with a telephone central office 32. As in the system of FIG. 1, connections are provided between the cable transmission system 12 and n subscriber locations. Also, n two-way FDM channels are provided on the analog transmission facility 18 between the cable transmission system 12 and the central office 32. Each of the n two-way FDM channels is dedicated in a one-to-one relationship with a corresponding one of the n subscriber locations.

The central office 32 includes a building structure 34 in which are housed a transmultiplexer 36 provided in accordance with the invention, a digital switch 16' and a host computer 38. A digital transmission facility 20' interconnects the transmultiplexer 36 and the digital switch 16'. The digital transmission facility 20' has a total capacity of m two-way voice-grade TDM channels. The number of TDM channels provided by the digital transmission facility 20' is lower than the number of subscriber locations served via the n FDM channels of the analog transmission facility 18. The total capacity of the digital transmission facility 20' is selected by taking into account the extent to which many of the n FDM channels are likely to be idle at any given time. The ratio of n:m, representing the degree of concentration provided by the transmultiplexer 36, may be equal to two, four or other values, including ratios higher than four.

The digital switch 16', like the digital switch 16 shown in FIG. 1, is connected to provide selective communication between the subscriber locations of the cable transmission system 12 and access to subscribers in an external telephone network. An example of a device that is suitable for use as the digital switch 16' is a Harris # 20—20 digital switch. The Harris # 20—20 includes a host interface link (HIL) feature which makes it possible to control operation of the switch by command messages transmitted to the switch from the host computer 38. A local area network (LAN) 40 provides a messaging capability between the host computer 38 and the digital switch 16'. As will be seen, the switch 16' is arranged to receive and respond to command messages through the conventional HIL protocol. As an alternative to LAN 40, separate data transmission lines may be provided between host computer 38 and digital switch 16' and between host computer 38 and transmultiplexer 36.

The host computer 38 may be of the type conventionally used for controlling the Harris # 20—20 switch, but programmed to operate in accordance with practices to be described below.

In accordance with a preferred embodiment of the invention, transmultiplexer 36 is embodied by modifying a conventional Granger TM 7800-M1 transmultiplexer. The transmultiplexer 36, after modification in accordance with the invention, is able to exchange messages with the host computer 38 via the LAN 40, and responds to commands from the host computer 38 by providing variable interconnections between the FDM channels and the TDM channels coupled to the transmultiplexer.

Although the exemplary embodiment shown in FIG. 2 and discussed below only provides for one transmultiplexer controlled by the host computer 38, it is contemplated to provide a number of transmultiplexers, like multiplexer 36, either located in the same central office 32 or elsewhere, and controlled by the same host computer 38.

Details of the transmultiplexer provided in accordance with the invention will now be described with reference to FIG. 3.

As shown in FIG. 3, the transmultiplexer 36 includes digital-to-analog and analog-to-digital converters 42 for interfacing the FDM channels received over the analog transmission facility 18 to other components of the transmultiplexer 36. The converter block 42 outputs to a demodulator 44 a digital signal representative of the FDM signals received from the analog transmission facility 18. A translation oscillator 46 provides a sequence of reference signals at different frequencies, each of which is suitable for demodulating a respective one of the incoming channel signals. As will be seen, the sequence in which the reference frequencies are output by the translation oscillator 46 is subject to variation under control from a host interface module 48.

The demodulated incoming signal is output from the demodulator block 44 as a sequence of baseband digital signals which correspond to the FDM channels. The sequence of digital baseband signals is supplied to a filter block 50 which separates signalling tones present in the channel signals. The separated signalling tones are provided from the filter block 50 to a signalling tone detector 52. Signals detected at the signalling tone detector 52 are provided to a signalling mapping block 54 for assignment to the outgoing TDM channel which corresponds to the incoming FDM channel in which the signalling tone was received. As will be discussed below, the mapping of FDM channels to TDM channels is variable and is controlled by the host interface module 48. The suitably mapped signalling information is then output from the signalling mapping block 54 to a PCM interface unit 56 for insertion into the appropriate TDM output channel.

Voice data output from the filter block 50 is also supplied to the PCM interface unit 56 for format conversion into an appropriate form for transmission in the same TDM channel as the mapped signalling information. In a preferred embodiment of the invention, the output from the PCM interface unit 56 to the digital switch 16' is in accordance with the E1 digital transmission standard.

Signalling information received at the PCM interface unit 56 from the switch 16' through an E1 channel is supplied to the signalling mapping block 54 for mapping to a corresponding FDM channel. The signalling mapping block 54 drives a signalling tone generator 58 to implement the mapping. Signalling tones sequentially output from the signalling tone generator 58 are combined at a summation block 60 with corresponding voice data which passes through the PCM interface unit 56 from the E1 TDM transmission facility. A sequence of baseband digital channel signals, incorporating the signalling tones generated at the tone generator 58, are supplied from the summation block 60 to a modulator 62. The modulator 62 functions to allocate each of the sequenced digital baseband channel signals into a respective FDM channel. The FDM channel to which each digital baseband signal is assigned is a function of a reference frequency supplied to the modulator 62 from a translation oscillator 64. As before, the translation oscillator 64 generates a sequence of different reference frequencies. The sequence of frequencies generated by the translation oscillator 64 is varied under control of the host interface module 48.

The FDM modulated digital signal output from the modulator 62 is coupled via the D/A and A/D converter unit 42 for transmission in analog form on the analog transmission facility 18.

As indicated at 66, the host interface module 48 is connected to receive command messages from, and send status messages to, the host computer 38 (FIG. 2) via the LAN 40.

In the prior art TM 7800-M1 transmultiplexer, referred to above, no host interface module is provided, the transmultiplexer is not subject to control by a separate computer, and the reference frequencies respectively provided to the modulator and demodulator are produced in accordance with a fixed cycle that permanently assigns n FDM channels to n corresponding TDM channels. Also, the signalling mapping between the FDM and the TDM channels is provided on a fixed assignment basis.

By contrast, in the modified transmultiplexer illustrated in FIG. 3, n FDM channels are concentrated so as to share, with variable assignment, m (<n) TDM channels interfaced to the digital switch 16'. In the particular example shown in FIG. 3, the number of FDM channels is 60, and 30 TDM channels are shared by the 60 FDM channels, producing a concentration ratio of 2:1. Other concentration ratios, including ratios of 4:1 or higher, are also contemplated.

In the concentrating transmultiplexer 36, the host interface module 48 responds to command signals received from the host computer 38 by selectively assigning FDM channels to TDM channels as required to make connections with subscriber locations. Each channel assignment is released upon completion of the telephone call which required the assignment. When an FDM channel is idle, it is not assigned to any TDM channel. In this way, the TDM channels, and the switch 16', are used more efficiently than was possible with the prior art transmultiplexer.

In order to implement a desired assignment of an FDM channel to a TDM channel, in accordance with a command from the host computer 38, the host interface module 48 controls the translation oscillators 46 and 64 to vary the respective sequences by which the translation oscillators output reference frequencies to the demodulator 44 and the modulator 62. In effect, the demodulator 44 is caused to change the sequence in which FDM channels are selected for conversion to baseband signals output to the filter 50. Similarly, the modulator 62 is caused to change the sequence by which outgoing FDM channels are selected to receive the baseband signals sequentially supplied to the modulator 62 from the summing junction 60. When a call ends, the sequencing of the demodulator and modulator is changed to dis-assign the FDM channel involved from the corresponding TDM channel used for the call.

The host interface module 48 controls the PCM interface module 56 so that idle FDM channels are not associated with any TDM channels. However, the translation oscillators 46 and 64 always cycle through the complete set of reference frequencies, 60 in the example. Thus, signalling information for all FDM channels, regardless of their idle/busy status, is always available to and under the control of the host interface module 48 through the signalling mapping unit 54.

The host interface module 48 also controls the signalling mapping block 54, so that the mapping of signals between the FDM channels and the TDM channels is updated to reflect assignments and dis-assignments of TDM channels to FDM channels. Specifically, such updating occurs when a TDM channel is assigned to an FDM channel in response to a telephone call either originating from or sent to the subscriber location corresponding to the FDM channel. Also, the signalling mapping is updated when calls are terminated.

Before describing the sequence of events which occurs in connection with a telephone call, brief reference will be made to FIG. 4, which shows a telephone A (reference numeral 70) at a first subscriber location connected through an interface A (reference numeral 72) to a cable 74 that is part of the cable system 12 (FIG. 2). Continuing to refer to FIG. 4, a telephone B (reference numeral 76) at a second subscriber location is also connected to the cable 74, via an interface B (reference numeral 78). Although not explicitly shown in FIGS. 4 or 2, it will be understood that other telephones located at respective subscriber locations are also connected to the cable 74 through respective interfaces.

Figure 5:
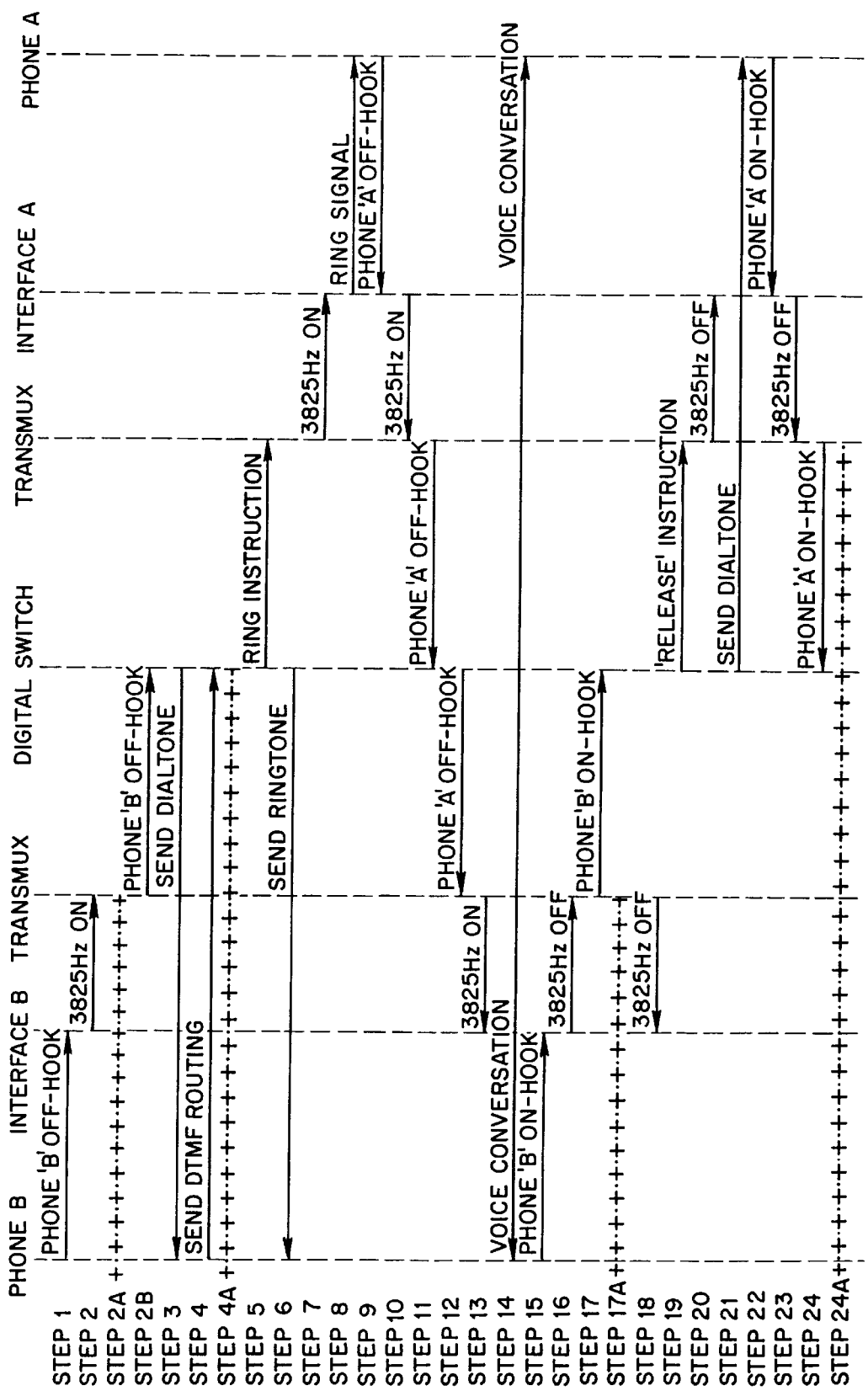
FIGS. 5 and 6 together form a timing chart which illustrates operation of the system of FIG. 2.
Figure 6:
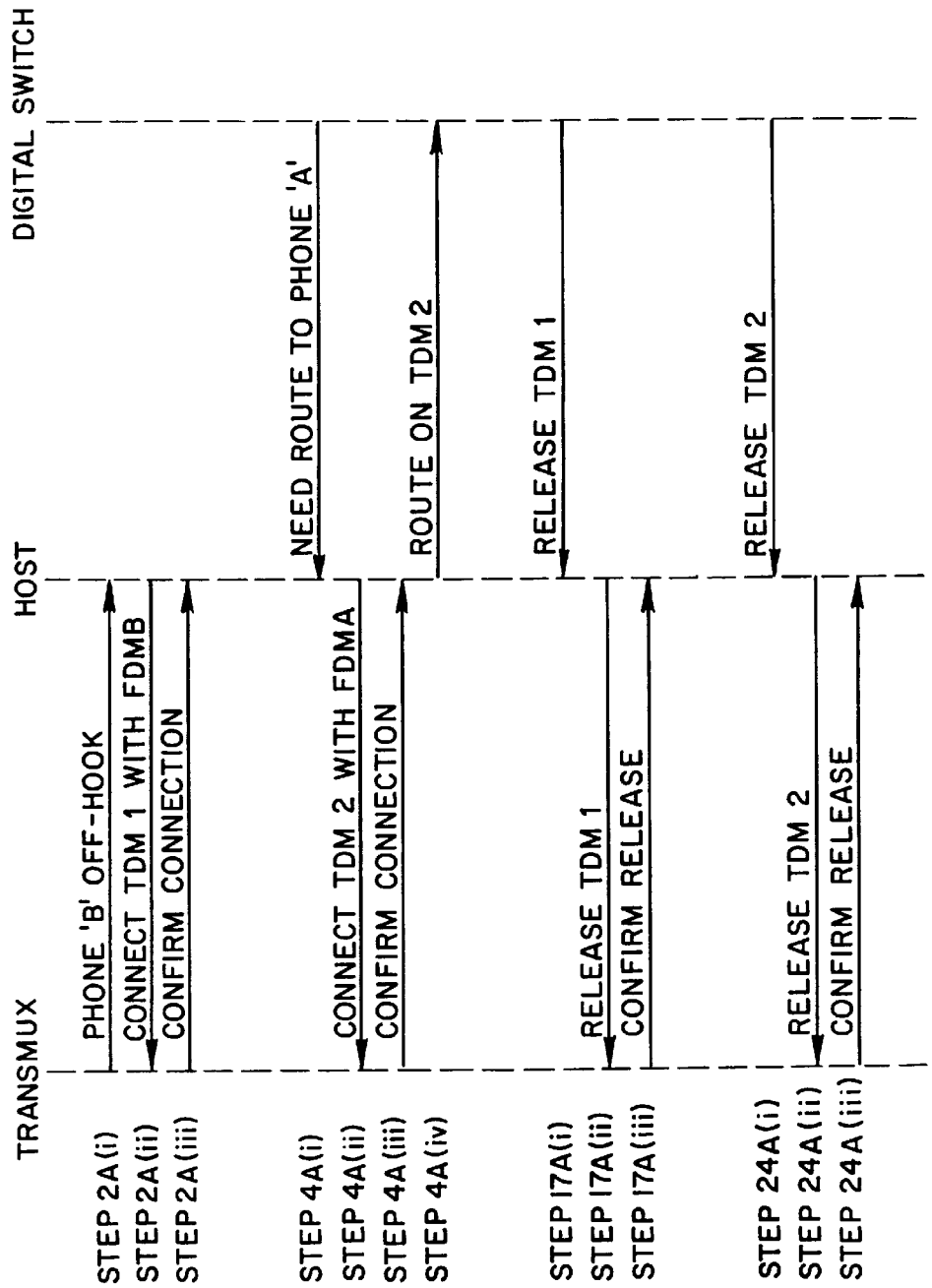

FIGS. 5 and 6 show the sequence of events which occur when a call is placed from phone B to phone A.

Step 1 (FIG. 5): —PHONE B OFF-HOOK—; When phone B goes off-hook, the interface B detects a change in the state of the associated tip and ring lines.

Step 2: —3825 Hz ON—; The interface B causes a 3825 Hz tone to be continuously transmitted to the transmultiplexer 36.

Step 2A(i) (FIG. 6): —PHONE B OFF-HOOK—; The 3825 Hz tone is received at the transmultiplexer 36 through the converter block 42, demodulator 44, filter 50, tone detector 52 and signalling mapping block 54. The signalling mapping block 54 then provides a signal to the host interface module 48 indicating that phone B has gone off-hook, and a corresponding status message containing the identity of phone B is dispatched from the host interface module 48 to the host computer 38 via LAN 40.

Step 2A(ii): —CONNECT TDM1 WITH FDMB—; Upon receiving the status message, the host computer, which controls the busy/idle status of the TDM channels, determines if any TDM channels connected to the transmultiplexer 36 are idle, and if so, dispatches a command message to the host interface module 48 directing that the FDM channel corresponding to phone B be assigned to an idle TDM channel (in this case assumed to be TDM channel 1).

Step 2A(iii): —CONFIRM CONNECTION—; The transmultiplexer complies with the command from the host computer by assigning FDM channel B to TDM channel 1 in the manner described above, and then sends a status message confirming the assignment to the host computer.

Step 2B (FIG. 5): —PHONE B OFF HOOK—; As a result of receiving and detecting the 3825 Hz tone in FDM channel B according to Step 2A(i) above and of assigning FDM channel B to TDM channel 1 according to Step 2A(iii) above, an off-hook signal is transmitted to the digital switch 16' in the TDM control channel corresponding to TDM channel 1 via the transmultiplexer's PCM interface unit 56.

Step 3: —SEND DIALTONE TO PHONE B—; The digital switch 16' places a dialtone signal in the voice channel for TDM channel 1, and the dialtone is delivered to phone B via the transmultiplexer 36, the analog transmission facility 18, the cable transmission system 12, and interface B.

Step 4: —SEND DTMF PHONE NUMBER—; Upon receiving dial tone, the DTMF phone number of phone A is transmitted from phone B to the digital switch 16' via the interface B, cable transmission system 12, the analog transmission facility 18, and the transmultiplexer 36, and thence through the digital transmission facility 20'. At the switch 16', the DTMF phone number dialed is looked up in a memory and found to correspond to another subscriber of the cable system, namely phone A.

Step 4A(i) (FIG. 6): —NEED ROUTE TO PHONE A—; Having determined that the call initiated at phone B is to be terminated at phone A, which is served by the cable transmission system 12 and transmultiplexer 36, the digital switch 16' dispatches to the host computer 38 a message requesting routing instructions in order to complete the connection to phone A. The digital switch 16' then waits for instructions from the host 38.

Step 4A(ii): —CONNECT TDM2 WITH FDMA—; In response to the routing request received from the digital switch 16', the host 38 selects an idle TDM channel and dispatches a command message containing the identity of phone A to the transmultiplexer 36 (via its host interface module 48), directing that the FDM channel corresponding to phone A be assigned to the selected TDM channel, assumed in this case to be channel 2.

Step 4A(iii): —CONFIRM CONNECTION—; The transmultiplexer complies with the command to assign FDM channel A to TDM channel 2 and sends to the host computer a status message confirming the assignment.

Step 4A(iv): —ROUTE ON TDM 2—; To complete the connection between phones A and B, the host computer 38 directs the digital switch 16' to route the call from phone B (assigned to TDM channel 1) for connection to the TDM channel 2 which has been assigned to phone A.

Step 5 (FIG. 5): —RING INSTRUCTION—; The digital switch 16' sends a message in the control channel of the TDM signal channel assigned to phone A instructing the transmultiplexer 36 to apply a 3825 Hz tone on the FDM channel which corresponds to phone A.

Step 6: —SEND RING TONE TO ORIGINATOR—; The digital switch 16' then sends a ringing tone to phone B via the TDM channel 1 and, after passage through the transmultiplexer 36, via the FDM channel corresponding to phone B.

Step 7: —3835 Hz ON—; The transmultiplexer 36 turns on the 3825 Hz signal for the FDM channel corresponding to phone A.

Step 8: —RING SIGNAL—; The interface A detects the presence of the 3825 Hz signal and causes phone A to ring.

Step 9: —PHONE A OFF-HOOK—; When phone A is answered, there is a detectable change in the state of the associated tip and ring lines.

Step 10: —3835 Hz ON—; The interface A detects the change in state on the tip and ring lines of phone A and transmits a continuous 3825 Hz tone to the transmultiplexer 36 via the FDM channel corresponding to phone A. At the same time, the ring signal on the tip and ring lines of phone A is disasserted.

Step 11: —PHONE A OFF-HOOK—; Transmultiplexer 36 detects the presence of the 3825 Hz tone in the FDM channel corresponding to phone A and transmits an off-hook signal to the switch 16' via the TDM control channel corresponding to TDM channel 2 which has been assigned to phone A.

Steps 12 and 13: —PHONE A OFF-HOOK— and —3825 Hz ON—; These steps are provided to indicate to the transmultiplexer 36 and the interface B that phone A has answered.

Step 14: —VOICE CONVERSATION—. At this time digital switch 16' and transmultiplexer 36 have, pursuant to commands received from the host computer 38, established a virtual talk path between the calling phone B and the called phone A. The path has been implemented by assigning previously idle TDM channel 1 to the FDM channel corresponding to phone B, assigning previously idle TDM channel 2 to the FDM channel corresponding to phone A, and establishing a connection at switch 16' between the TDM channels 1 and 2. Bi-directional conversation can now occur.

Step 15: —PHONE B ON-HOOK—; When phone B goes on hook (i.e., hangs up) to terminate the telephone call, interface B detects a change in the state of the associated tip and ring lines.

Step 16: —3825 Hz OFF—; The interface B causes the 3825 Hz tone to be turned off.

Step 17: —PHONE B ON-HOOK—; Transmultiplexer 36 detects the absence of the 3825 Hz tone on the FDM channel corresponding to phone B and transmits an on-hook signal to the digital switch 16' in the control channel of the TDM channel 1 which had been assigned to phone B.

Step 17A(i) (FIG. 6): —RELEASE TDM1—; Upon receiving the on-hook signal, the digital switch 16' advises the host computer 38 that TDM channel 1 should be released from its assignment to phone B.

Step 17A(ii): —RELEASE TDM1—; The host computer sends a command message to transmultiplexer 36 directing that TDM1 be released.

Step 17A(iii): —CONFIRM RELEASE—; In response to the release command received from the host computer, the transmultiplexer 36 dis-assigns TDM channel 1 from the FDM channel corresponding to phone B. This renders TDM channel 1 idle and available for assignment to another subscriber location, and is accomplished by removing the channel connection in the PCM interface unit 56, and by also changing the signalling mapping relationships provided by signalling mapping block 54. The transmultiplexer then sends to the host computer a status message to confirm that TDM channel 1 has been released.

Step 18 (FIG. 5): —3825 Hz OFF—; Transmultiplexer 36 provides to interface B an indication that the telephone channel connection has been broken.

Step 19: —"RELEASE" INSTRUCTION—; Digital switch 16' sends an on-hook signal to transmultiplexer 36 to indicate that the connection that was established at step 14 above between TDM channels 1 and 2 has been removed.

Step 20: —3825 Hz OFF—; Transmultiplexer 36 sends a signal to interface A to indicate that the connection is no longer available.

Step 21: —SEND DIALTONE TO PHONE A—; The digital switch places a dialtone signal in the voice channel for TDM channel 2, and the dialtone is delivered to phone A.

Step 22: —PHONE A ON-HOOK—; When phone A is placed on-hook, there is a detectable change on its associated tip and ring lines.

Step 23: —3825 Hz OFF—; The interface A detects the change in state and ceases the transmission of the 3825 Hz tone on the FDM channel corresponding to phone A.

Step 24: —PHONE A ON-HOOK—; Transmultiplexer 36 sends an on-hook signal to the digital switch 16' to indicate that phone A has gone on-hook.

Step 24A(i) (FIG. 6): —RELEASE TDM2—; Upon receiving the on-hook signal, the digital switch advises the host computer that TDM channel 2 should be released from its assignment to phone A.

Step 24A(ii): —RELEASE TDM2—; The host computer sends a command message to transmultiplexer 36 directing that TDM2 be released.

Step 24A(iii): —CONFIRM RELEASE—; The transmultiplexer 36 releases the assignment of TDM channel 2 to the FDM channel corresponding to phone A and sends a status message to the host computer confirming release of TDM channel 2.

The above-described process is repeated for subsequent phone conversations.

In the example just given, the 3825 Hz signalling tone is asserted in connection with establishing the telephone call and is disasserted in connection with ending the call. However, the equipment could be arranged so that the 3825 Hz signalling is performed with the opposite polarity, i.e., by disasserting the tone to set up the call and asserting the tone to end the call.

Figure 7:
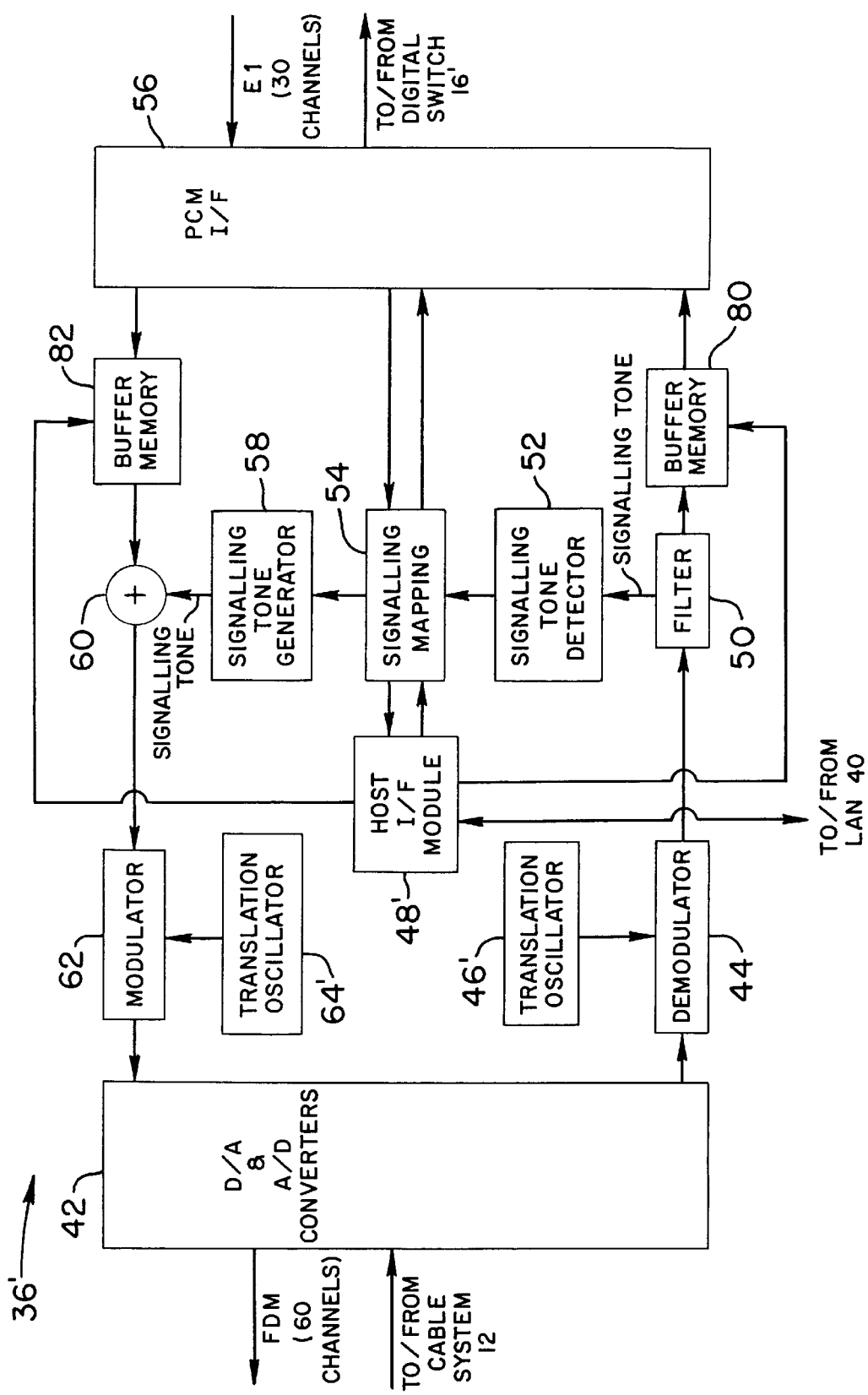
FIG. 7 shows an alternative embodiment of the transmultiplexer of FIG. 3.

FIG. 7 shows an alternative embodiment 36' of the transmultiplexer previously discussed in connection with FIG. 3.

Elements 42, 44, 50, 52, 54, 56, 58, 60 and 62 are the same in the transmultiplexer embodiment shown in FIG. 7 as in the previously-described embodiment, and so will not be further discussed. The translation oscillators 46' and 64' used in the embodiment of FIG. 7 are not subject to control by a host interface module. Instead, the translation oscillators 46' and 64' output the reference frequencies in a fixed sequence, so that the demodulator 44 and the modulator 62 demodulate and modulate the 60 incoming and outgoing FDM channels in a fixed order.

In the embodiment of FIG. 7, buffer memories 80 and 82 are provided to carry out variable assignment of the voice data in FDM channels to TDM channels under control of the host interface module 48'. As in the embodiment of FIG. 3, the host interface module 48' implements the variable assignment between the FDM channels and the TDM channels in response to command messages received from the host computer 38.

According to the embodiment of FIG. 7, buffer memory 80 is provided in the FDM-to-TDM direction between the filter 50 and the PCM interface unit 56. The buffer memory 82 is provided in the TDM-to-FDM direction between the PCM interface unit 56 and the summation block 60.

The sequence of baseband digital signals corresponding to the FDM channels, as provided through the filter 50 by the demodulator 44, is made available to the buffer memory 80, and a subset of the signals is read out from the memory 80 to the PCM interface unit 56 in a sequence that implements a desired assignment of FDM channels to TDM channels. According to one possible implementation, baseband digital signals supplied to the buffer memory 80 and representing idle FDM channels (or at least FDM channels that have not been assigned to a TDM channel), simply are not stored in the buffer memory. The sequence for reading out the stored signals from the memory 80 is subject to control by the host interface module 48'.

Similarly, signals provided from the PCM interface unit 56 to the buffer memory 82 and corresponding to an idle TDM channel may simply not be stored in the buffer memory 82. The sequence in which the signal stored in the buffer memory 82 is read out is again controllable by the host interface module 48' to implement the desired assignment of TDM channels to FDM channels. In the case of both buffer memories 80 and 82, it will be recognized that the sequence in which data is read out from the respective memory will usually differ from the sequence in which the data was read into the memory, and that variable delays are therefore provided by both of the buffer memories.

Although the buffer memories 80 and 82 are shown as functionally separate in FIG. 7, it is contemplated to use a single memory device to implement both buffer memories.

Figure 8:
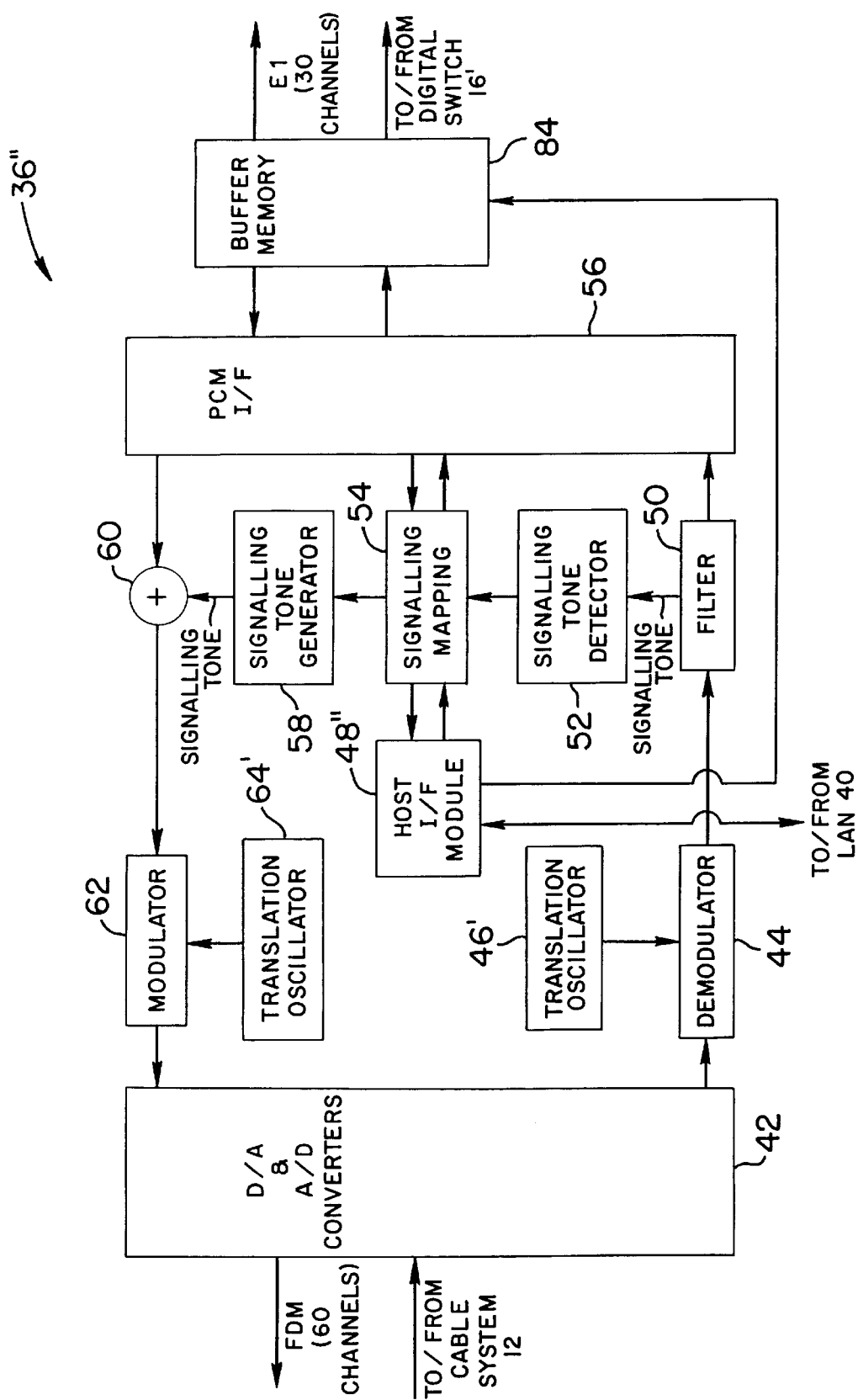
FIG. 8 shows another alternative embodiment of the transmultiplexer of FIG. 3.

Another embodiment 36" of the transmultiplexer is shown in FIG. 8. The embodiment of FIG. 8 is similar to that of FIG. 7, except that in FIG. 8 a buffer memory 84 is provided on the E1 side of the PCM interface unit 56, and no buffer memories are on the other side of the interface unit 56. As in the embodiment of FIG. 7, the buffer memory 84 is controlled by an interface module 48" to provide variable delays for digital signals provided for transmission in both directions, to make desired assignments of TDM channels to FDM channels.

By providing a concentrating, computer-controlled transmultiplexer, like that shown in any one of FIGS. 3, 7 and 8, between the cable system 12 and the digital switch 16', it becomes possible to adaptively share among a plurality of FDM channels a smaller plurality of digital switch ports, thereby achieving significant savings in the provisioning of switch interface equipment.

In all cases it is understood that the above-described arrangements are merely illustrative of the many possible specific embodiments which represent applications of the present invention. Numerous and varied other arrangements can be readily devised in accordance with the principles of the present invention without departing from the spirit and scope of the invention. As one example, it is contemplated that the FDM channels may be distributed to the subscriber locations through transmission facilities that are used only for telephony, and do not carry video signals. The principles of the present invention are applicable to any telephony system which connects subscribers to a TDM switch via FDM transmission facilities.

What is claimed is:

1. A transmultiplexer comprising:
   means connected between digital facilities and analog facilities for translating information between time division multiplexed (TDM) and frequency division multiplexed (FDM) formats on said digital and analog facilities, respectively, wherein information in said TDM format is representative of a plurality of digital telephone signal channels and information in said FDM format is representative of a plurality of analog telephone signal channels, said digital facilities having a total capacity of m voice-grade digital channels and said analog facilities having a total capacity of n voice-grade analog channels, with n>m; and control means for selectively coupling any one of said m voice-grade digital channels to any one of said n voice-grade analog channels.

2. A transmultiplexer according to claim 1, wherein n≧2m.

3. A transmultiplexer according to claim 2, wherein m≧30.

4. A transmultiplexer according to claim 1, wherein said control means includes means for receiving a command message from a host computer, said command message indicating a particular one of said analog telephone signal channels and a particular one of said digital telephone signal channels, said control means also including assignment means for assigning said particular one of said analog telephone signal channels to said particular one of said digital telephone signal channels in response to said command message received from said host computer.

5. A transmultiplexer according to claim 4, wherein said assignment means includes sequencing means having:

variable oscillator means for sequentially oscillating at a plurality of different frequencies according to a variable sequence, each of said frequencies for demodulating a respective one of said analog telephone signal channels; and means responsive to the received command message for varying said variable sequence of said different frequencies.

6. A transmultiplexer according to claim 4, wherein said assignment means includes sequencing means having:

a buffer memory for temporarily storing digital signals carried in said digital telephone signal channels; and memory control means for controlling said buffer memory so that said digital signals are written into said buffer memory according to a first sequence and are read out from said buffer memory according to a second sequence different from said first sequence.

7. A transmultiplexer according to claim 6, wherein said memory control means includes means for varying at least one of said first sequence and said second sequence in response to said received command message.

8. A transmultiplexer comprising:

means connected between digital facilities and analog facilities for translating information between time division multiplexed (TDM) and frequency division multiplexed (FDM) formats on said digital and analog facilities, respectively, wherein information in said TDM format is representative of a plurality of digital telephone signal channels and information in said FDM format is representative of a plurality of analog telephone signal channels; and control means for controlling variable interconnection of ones of said digital telephone signal channels to ones of said analog telephone signal channels, said control means including means for receiving a command message from a host computer, said command message indicating a particular one of said plurality of analog telephone signal channels in said analog facilities and a particular one of said plurality of digital telephone signal channels in said digital facilities, said control means also including assignment means for assigning said particular one of said analog telephone signal channels to said particular one of said digital telephone signal channels in response to said command message received from said host computer.

9. A transmultiplexer according to claim 8, wherein said analog facilities have a total capacity of n voice-grade analog channels and said digital facilities have a total capacity of m voice-grade digital channels, with n≠m.

10. A transmultiplexer according to claim 9, wherein n≧2m.

11. A transmultiplexer according to claim 10, wherein m≧30.

12. A concentrating transmultiplexer, comprising:

analog-to-digital (A/D) converter means for converting an analog signal corresponding to a multi-channel FDM signal into a digital signal;

demodulator means for demodulating said digital signal formed by said A/D converter means to form a plurality of baseband digital signals each corresponding to a respective channel of said multi-channel FDM signal;

first translation oscillator means for generating a first sequence of reference frequency signals which are all different from each other, said demodulator means demodulating said digital signal formed by said A/D converter means with reference to said first sequence of reference frequency signals generated by said first translation oscillator means;

filter means for separating signalling tones from said baseband digital signals formed by said demodulator means;

signalling tone detector means for detecting said signalling tones separated by said filter means;

interface means for connecting the multiplexer to a multi-channel TDM digital transmission facility;

signalling mapping means for routing to respective channels of said digital transmission facility signals corresponding to the signalling tones detected by said signalling tone detector means;

tone injection means responsive to said signalling mapping means for injecting signalling tones in respective digital baseband signals received from said digital transmission facility by said interface means;

modulator means connected to said tone injection means for modulating said baseband digital signals having the signalling tones injected therein to form a multi-channel digital signal in an FDM format;

digital-to-analog converter means for converting said multi-channel digital signal in an FDM format into a multi-channel analog output signal in an FDM format;

second translation oscillator means for generating a second sequence of reference frequency signals which are all different from each other, said modulator forming said multi-channel digital signal in an FDM format with reference to said second sequence of reference frequency signals generated by said second translation oscillator means; and control means, responsive to command messages received from a host computer and connected to said first and second translation oscillator means and said signalling mapping means, for varying said first and second sequences of reference frequency signals to effect assignment of ones of said channels of said multi-channel FDM signal to respective ones of said channels of said multi-channel TDM digital transmission facility.

13. A concentrating transmultiplexer according to claim 12, wherein n FDM channels are concentrated by selective assignment to m TDM channels, with n≧2m.

14. A concentrating transmultiplexer according to claim 13, wherein m≧30.

15. A telephone central office facility, comprising:

a building structure;

means within the building structure for terminating a shared analog transmission facility on which are provided n analog telephone signal channels in a frequency division multiplexed (FDM) format, each of said n analog telephone signal channels corresponding to a respective one of n telephone subscriber locations (n being an integer greater than 2);

a transmultiplexer, housed within the building structure and connected to said terminating means, for interfacing said n analog telephone signal channels to a plurality of time-division multiplexed (TDM) digital telephone signal channels while concentrating said n analog telephone signal channels so that said plurality of TDM digital telephone signal channels to which said n analog telephone signal channels are interfaced consists of a total of m TDM digital telephone signal channels, with m being an integer less than n;

a digital telephone switch housed within said building structure and coupled to said m digital telephone signal channels and to another plurality of digital telephone signal channels for selectively providing interconnections between ones of said m digital telephone signal channels and of said another plurality of digital telephone signal channels; and a host computer housed within said building structure for providing command messages to said transmultiplexer and to said digital telephone switch to control said transmultiplexer and said digital telephone switch.

16. A telephone central office facility according to claim 15, further including means for relaying, from said transmultiplexer to said digital switch, telephone line status signals originated at said subscriber locations.

17. A telephone central office facility according to claim 15, wherein n≧2m.

18. A telephone central office facility according to claim 17, wherein m≧30.

19. A system comprising:

a plurality of telephone subscriber locations, each telephone subscriber location including means for establishing an RF transmitting channel and an RF receiving channel associated with the subscriber location for conveying signalling and analog voice information from and to, respectively, the subscriber location;

a broadband cable network for carrying the RF receiving and transmitting channels of said subscriber locations in a frequency division multiplexed (FDM) format; and switching means responsive to said cable network for enabling each RF transmitting channel on the cable network to be selectively coupled to any of the RF receiving channels on the cable network, whereby voice communication between the subscriber locations of the coupled channels is enabled, said switching means including:

transmultiplexer means for selectively assigning to each RF transmitting channel a corresponding transmitting digital channel for carrying digital voice information corresponding to the analog voice information carried by the corresponding RF transmitting channel and for selectively assigning to each RF receiving channel a corresponding receiving digital channel for carrying digital voice information corresponding to the analog voice information carried by the corresponding RF receiving channel, said digital channels being in a time division multiplexed (TDM) format;

a digital switch for selectively coupling each transmitting digital channel to any of the receiving digital channels;

a host computer for generating command signals; and means interconnecting said host computer, said digital switch and said transmultiplexer means for transmitting respective ones of said command signals from said host computer to said digital switch and said transmultiplexer means;

said digital switch performing said coupling of said transmitting digital channels to said receiving digital channels in response to command signals transmitted from said host computer; and said transmultiplexer means performing said assignment of said RF transmitting channels to said transmitting digital channels and said assignment of said RF receiving channels to said receiving digital channels in response to command signals transmitted from said host computer.

20. A system according to claim 19, wherein said plurality of telephone subscriber locations includes n locations, and a total number of m digital receiving channels is available for assignment by said transmultiplexer means to said RF receiving channels, where m is an integer less than n and n is an integer greater than 2.

21. A system according to claim 20, wherein n≧2m.

22. A system according to claim 21, wherein n≧4m.

23. A system according to claim 21, wherein m≧30.

24. A system according to claim 19, wherein said interconnecting means includes a local area network.

25. A system according to claim 19, further comprising means for coupling a plurality of broadband video signal channels to said cable network for transmission by said cable network to said subscriber locations.

* * * * *